(12) United States Patent
Clayton et al.

(10) Patent No.: US 6,931,497 B2
(45) Date of Patent: Aug. 16, 2005

(54) SHARED MEMORY MANAGEMENT UTILIZING A FREE LIST OF BUFFER INDICES

(75) Inventors: Shawn Adam Clayton, Boylston, MA (US); Shaun Andrew McMaster, Bloomfield, CO (US); Thomas V. Spencer, Fort Collins, CO (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 164 days.

(21) Appl. No.: 10/340,078

(22) Filed: Jan. 9, 2003

(65) Prior Publication Data

US 2004/0139284 A1 Jul. 15, 2004

(51) Int. Cl.[7] .............................................. G06F 12/00
(52) U.S. Cl. ...................................... 711/147; 711/170
(58) Field of Search ......................... 711/147, 170–172, 711/110

(56) References Cited

U.S. PATENT DOCUMENTS 5,432,908 A * 7/1995 Heddes et al. .............. 711/147
5,682,553 A * 10/1997 Osborne ...................... 710/56

* cited by examiner

*Primary Examiner*—Matthew D. Anderson
(74) *Attorney, Agent, or Firm*—Morrison & Foerster LLP

(57) ABSTRACT

A method includes receiving a first buffer allocation command from a first processor, the allocation command including a register address associated with a pool of buffers in a shared memory, determining whether a buffer is available in the buffer pool based upon a buffer index corresponding to a free buffer, and if a buffer is determined available allocating the buffer to the first processor.

17 Claims, 2 Drawing Sheets

500
SHARED MEMORY MANAGEMENT UTILIZING A FREE LIST OF BUFFER INDICES

TECHNICAL FIELD

This application relates to managing memory.

BACKGROUND

A multi-processor system may include a shared memory, i.e., the same memory may be accessed (read or written) by two or more processors in the system. The shared memory may also be logically partitioned into buffers.

DESCRIPTION

Figure 1:
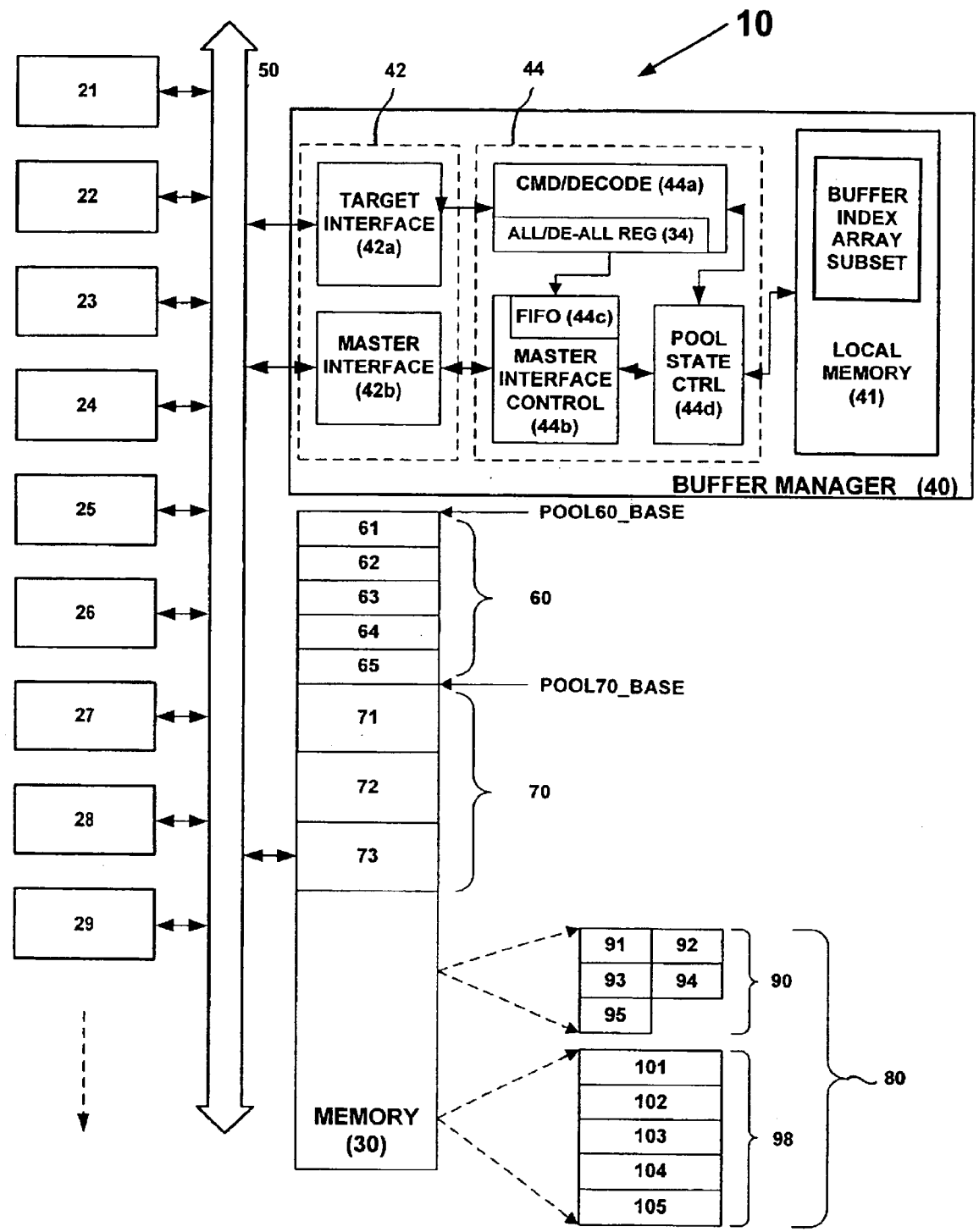
FIG. 1 is a block diagram of a multi-processor system.

FIG. 1 shows a multi-processor system 10 that includes processors 20–29, a memory 30 and a buffer manager (BMGR) 40 having a local memory 41. Each of the processors 21–29, memory 30 and BMGR 40 are coupled to a system bus 50. In operation, each of the processors 20–29 and BMGR 40 may access memory 30, e.g., read data from and/or write data to memory 30. In an embodiment, memory 30 is logically partitioned into buffer pools 60 and 70, each pool including a set of buffers of the same size. In this example, buffers 61–65 are included in pool 60, and buffers 71–73 are including in pool 70. Memory 30 also stores at least one buffer information array 80 that includes a buffer index array 90 holding buffer indices 91–95, and a reference count (R_CNT) array 98 holding R_CNTs 101–105. In this embodiment, buffer indices 91–95 and R_CNTs 101–105 correspond to buffers 61–65, respectively, in buffer pool 60. Buffer index array 90 may be referred to as a "free list" of buffer indices 91–95. The free list of buffer indices 91–95 and R_CNTs 101–105 are used by BMGR 40 to manage the allocation and de-allocation of buffer(s) within a pool, as will be explained. BMGR 40 stores a subset of each free list of buffer indices from buffer index array 90 in local memory 41. BMGR 40 includes a set of pool allocate/deallocate registers 34, each allocate/deallocate register corresponding to a buffer pool in memory 30. During operation of system 10, a processor may request a buffer allocation by sending a read command to BMGR 40 that specifies an allocate/deallocate register 34 corresponding to a buffer pool in memory 30. In response, BMGR sends a buffer pointer address of a buffer to the requesting processor, the buffer pointer address based upon a buffer index on the free list of buffer indices stored in local memory 41.

As described herein, in an embodiment, only a subset of each free list of buffer indices from buffer index array 90 are stored in local memory 41. In this way, the size of local memory 41 on BMGR 40 may be reduced. The free list indices stored in local memory 41 are stored in a so-called free list circular queue. Circular queue refers to a queue where data (or addresses) is stored in consecutive locations on the queue, beginning at a first location and continuing until an end location is reached, when the queue wraps to allow data (or addresses) to be over-written at the beginning of the queue. In an embodiment of system 10, the free list circular queue is referenced by two pointers, a "head" pointer and a "tail" pointer. The head pointer is used to point to the next buffer index in local memory 41 available for allocation, and the tail pointer is used to point to the next buffer index in local memory 41 that may be written back to memory 30.

Figure 2:
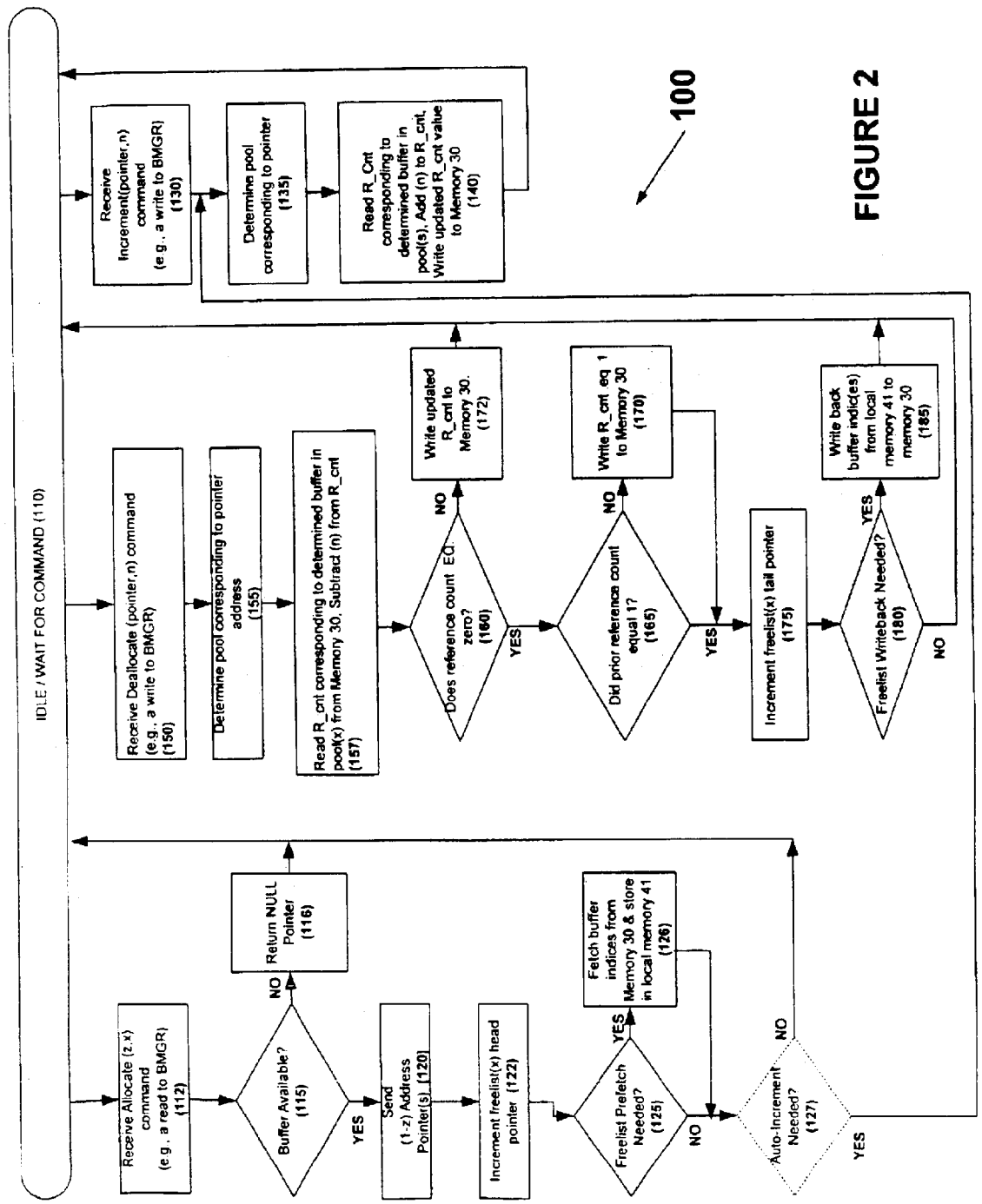
FIG. 2 is a flowchart of a process for managing buffers.

FIG. 2 shows a process 100 that may be performed by BMGR 40 to allocate buffers to a requesting processor 21–29. During performance of process 100, BMGR 40 is idle (110) awaiting a command from a processor 21–29. For a received allocation command (112), process 100 determines (115) if a buffer is available for allocation (e.g., a buffer index is available on BMGR 40 free list queue). If a buffer index is determined available, BMGR 40 sends (120) a buffer pointer address corresponding to the allocated buffer to the first processor, increments (122) the head pointer to point to the next buffer index on the free list queue. If a buffer index is not determined available, BMGR 40 returns (116) a Null pointer (e.g., zero value) to the first processor. Process 100 includes determining (125) whether more buffer indices need to be pre-fetched to maintain a sufficient number of buffer indices on the free list circular queue in local memory 41, and pre-fetching (126) additional buffer indices from memory 30 if it is determined (125) that more buffer indices are needed.

Performing process 100 may also allow two or more processors 21–29 to share access to a specific buffer within a buffer pool. In this embodiment, if a first processor has a buffer allocated, the first processor may allow a second processor to access the allocated buffer. For example, the first processor may send the address of the allocated buffer to the second processor. At about the same time that the second processor begins accessing the allocated buffer, the second processor may send a buffer increment command to BMGR 40. Still referring to process 100 (see FIG. 2), for a received (130) buffer increment command BMGR 40 determines (135) the appropriate buffer pool corresponding to the pointer address, and reads, add 'n' to R_CNT (e.g., increment R_CNT) and writes back (140) the R_CNT corresponding to the allocated buffer. First and second processors may continue accessing the allocated buffer. When a processor no longer needs to access the allocated buffer, that processor may send a de-allocation command to BMGR 40. For a received (150) de-allocation command, BMGR 40 determines (155) the buffer pool corresponding to the de-allocation command, read (157) the corresponding R_CNT from memory 30 and subtract (157) 'n' from R_CNT (e.g., decrement R_CNT), and determines (160) if the corresponding R_CNT equals zero, if the corresponding R_CNT is determined to be equal to zero process 100 determines (165) if the corresponding R_CNT equaled one in the prior determination (160) increments (175) the free list tail pointer, determines (18) if the free list requires a write back of buffer indices and writes back (185) buffer indices from the free list of buffer indices in local memory 41 to shared memory 30, and returns to wait (110) for commands.

This way of managing buffers allows a processor to request a buffer allocation with a single allocation command (e.g., a single read command), and request a buffer de-allocation with a single de-allocation command (e.g., a single write command). It also allows buffers to be shared between multiple processors without requiring the processors to manage the overhead of shared buffer information. Moreover, this way of managing buffers allows a processor to request an allocation or de-allocation of a buffer without causing a stall of the system bus and/or the processor while BMGR 40 processes the request. Furthermore, process 100 includes the pre-fetching of buffer indices from shared memory 30 to be stored in local memory 40. Therefore, subsequent allocation requests from a processor may be processed in less time than would be required if buffer indices were only fetched when requested by a processor. Conversely, BMGR 40 may write back buffer indices from the free list to buffer index array 90 as buffers are de-allocated.

A buffer allocation command may be implemented as a read to a buffer pool's allocate/deallocate command register 34. Buffer manager 40 responds to an allocation command by sending a write command to the requesting processor that includes a buffer pointer address. A buffer de-allocation command may be implemented as a write command to a buffer pool's allocate/deallocate command register 34.

In an embodiment, a single allocate/deallocate register may be designated for both allocate and de-allocate commands. In an embodiment, allocate/deallocate registers 34 are implemented as thirty-two (32) registers, each register corresponding to a buffer pool in memory 30. However, there could be more or fewer buffer pools and a corresponding number of allocate/deallocate registers.

In an embodiment, each buffer pool has a corresponding base addresses, in this example, pool60_base and pool70_base identify the location in memory 30 of the first buffer within each pool 60 and 70, respectively. Each buffer pool may also include corresponding variables to identify characteristics of the pool. For example, a "buff_sizeX" variable may be used to indicate a size (e.g, a number of memory locations) of each buffer in a pool, and a "#_buffX" variable is used to indicate a number of buffers included in a pool. During operation of system 10, buff_sizeX and #_buffX variables are used by BMGR 40 to calculate buffer index values stored in array 90 and also used by BMGR 40 to determine corresponding buffer pointer values from a buffer index value.

In more detail, buffers may be accessed (e.g., read or written) by commands that include a buffer pointer address. However, the free list circular queue on BMGR 40 is used to store buffer indices. Therefore, when a buffer is allocated to a processor the buffer index from the free list is converted to a buffer pointer address that is returned to the requesting processor. In an embodiment, the buffer index for a buffer in a pool is determined by using its buffer pointer address in memory 30 and the associated variables for the buffer pool containing that buffer, e.g., buff_sizeX and #_buffX. As an example, the buffer index for a first buffer may be set equal to a value determined by dividing the buffer pointer address for the buffer by the buff_sizeX variable for the pool containing that buffer. Conversely, the buffer pointer address for a buffer may be determined by multiplying its buffer index value by the associated buff_sizeX value of the pool containing that buffer.

The number of buffer pools and characteristics of each buffer pools are programmable, e.g., the characteristics of each buffer pool are set during a system initialization sequence or during system operation. Buffer pools and their characteristics are initialized before operation of system 10 and typically remain static during operation. In order to change a buffer pool characteristic during operation of system 10, all activity to a pool must be stopped, and buffer pool characteristic values re-set, and then operations dealing with that buffer may be resumed.

In an embodiment of system 10, BMGR 40 includes a bus interface 42 for receiving commands from and sending commands to processors 21–29 and for receiving data from and sending data to memory 30. Buffer manager 40 also includes decode logic 44 that decodes received commands from bus interface 42, and determines buffer pointer addresses from buffer indices.

In an embodiment, during operation of system 10, BMGR 40 stores "pool context" information in local memory 41, e.g., information related to each buffer pool managed by BMGR 40. For example, pool context information may include the pool base address, and variables buff_sizeX and #buffx associated with a buffer pool. The pool context information is usable by decode logic 44 to convert a buffer index on the free list into a buffer pointer address usable by a processor when accessing a buffer in a buffer pool.

In an embodiment, a processor may request an allocation or de-allocation of multiple buffers with a single command. For example, a processor may send a command that specifies a single buffer, or a command that specifies four buffers. As another example, a processor may send a buffer allocation command that specifies an 'n' value, the n value corresponding to a number of buffers requested by the processor. In response, BMGR 40 may return multiple buffer pointers to the requesting processor, each pointer corresponding to a location of an allocated buffer within a pool.

In an embodiment, multiple buffer indices are prefetched by BMGR 40 with a single bus 50 command (to reduce the amount of activity on bus 50). For example, anytime four or more buffer indices are allocated by BMGR 40, a prefetch command is placed in master FIFO 44c. Master interface control 44b may send a read command to memory 30 requesting four additional buffer indices from free list 90, and BMGR 40 will store those additional buffer indices when received from memory 30 in the free list queue for a buffer pool.

Process 100 may optionally include a MAX_RCNT value that is used as an increment value and/or decrement value applied to R_CNT during performance of process 100. For example, performance of actions (127), (135) and (140) allow a MAX_RCNT value to be used by when de-allocating multiple buffers.

In an embodiment of process 100, if BMGR 40 determines (115) that there are no buffers within a pool available to allocate, a null pointer (i.e., a value of zero) is returned to the requesting processor. In this case, the requesting processor may subsequently send another buffer allocation command. Still referring to FIG. 2, if process 100 determines (115) that there is not an available buffer on the free list, BMGR 40 sends (116) a null pointer to the requesting processor, and determines (125) if additional buffer indices are needed from memory 30, and fetches (126) buffer indices from memory 30 if additional buffer indices are determined needed by buffer manager 40.

In an embodiment, R_CNT values stored in memory 30 are initially set to a value of one (1) before a buffer is allocated to a processor. Therefore, during an allocation of a buffer the corresponding R_CNT is not incremented. This may reduce the number of bus command cycles performed by system 10. To deallocate a buffer or increment an R_CNT value, a processor does not need to know the buffer pool from which a buffer was allocated. In more detail, a processor may send a write command that includes a pointer address within an address ranges of a buffer pool to BMGR 40, and BMGR 40 will determine the pool corresponding to the buffer pool.

The following, Example 1, represents an example of the operation of system 10 that corresponds to the performance of process 100.

EXAMPLE 1

1) Processor 21 reads pool_10_alloc/dealloc register (@ BMGR address=0x0000_0540) and buffer index #5 is where the freelist head pointer is pointing (and therefore buffer index #5 must be in the local memory 41 prefetch buffer);

2) BMGR 40 determines a pointer address corresponding to buffer index #5, for example: pointer(pool=10, indice=5)=pool_10_base+(pool_10_buffer_size*5);

3) BMGR sends the determined pointer address (10,5) to processor 21, and also increments the head pointer of the circular queue free list to point to the next location on the circular queue freelist in preparation for another allocate command;

4) Processor 21 sends pointer (10,5) to processor 22 (in some case, processor 21 also sends a command, for example, a command for processor 22 to process data found in the buffer allocated to processor 21);

5) Processors 21 or 22 sends an increment command to BMGR 40 to increment the R_CNT corresponding to pointer (10,5), e.g., by sending a write command to an address in pointer (10,5); (Please realize that the write command to increment a R_CNT may include any address within an address range of a particular buffer and BMGR 40 will determine the appropriate buffer from the address and increments the corresponding buff R_CNT (10,5);

6) Processors 21 and 22 may continue to access the allocated buffer (10,5), at about the same time BMGR increments the corresponding buffer R_CNT (10,5) by reading R_CNT (10,5) from memory 30, incrementing R_CNT, and writing the updated R_CNT value back to memory 30;

7) When processor 21 is done accessing buffer (10,5) it sends a deallocation command to BMGR 40 by writing any address within buffer (10,5) to any pool_x deallocate register 34;

8) BMGR 40 receives the deallocation command, determines the corresponding R_CNT value for buffer (10,5), reads the R_CNT (10,5) value from memory 30, decrements R_CNT (10,5), determines that decremented R_CNT (10,5)=1, and writes decremented R_CNT (10,5) value back to memory 30;

9) When processor 22 is done accessing buffer (10,5), sends a deallocation command to BMGR 40 by writing any address within buffer (10,5) to any pool_x deallocate register 34;

10) BMGR 40 receives the deallocation command, determines the corresponding R_CNT value for buffer (10,5), reads the R_CNT (10,5) value from memory 30, decrements R_CNT (10,5)=0, determines that decremented R_CNT (10,5)=0, in this case instead of writing R_CNT (10,5)=0 back to memory, BMGR 40 leaves R_CNT (10,5)=1. Leaving R_CNT (pool,indice)=1 is significant since it may save the execution of two bus command transactions, e.g., a first bus command for reading, updating and writing back an R_CNT value transitioning from 1->0, and a second bus command for for transitioning from R_CNT from 0->1; and 11) BMGR 40 also increments the freelist tail pointer for this buffer pools circular queue in local memory 41.

In Example 1, please realize that in step 7) BMGR 40 increments R_CNT (10,5), and then in step 9) BMGR 40 decrements R_CNT (10,5). In an embodiment, it may be possible to eliminate the operations of steps 7) and 9). In more detail, if a first processor (e.g., processor 21) was designated as an "allocator" and a second processor (e.g., processor 22) was designated as a "deallocator". In this case, instead of having a plurality of processors each increment and deallocate, only one only processor performs a buffer allocation command and the second processor performs the only deallocation command of a particular buffer. This way of operation system 10, and/or process 100, may reduce the number of bus command cycles required to allocate, de-allocate buffer(s) and/or increment R_CNTs.

In an embodiment, an allocation or de-allocation command may include any address that is within the address boundaries of a buffer that is to be allocated or de-allocated. In more detail, BMGR 40 may perform an address boundary check on the pointer address sent by the processor to determine which buffer's R_CNT requires updating (for example, see actions (155) and (135) as depicted in FIG. 2). This way of performing address boundary checking by BMGR 40 means that processors 21–29 do not have to store a base pool address of a buffer allocated in order to request a buffer allocation or de-allocation. Therefore, any pointer address of a location within a buffer may be used as part of an allocation or de-allocation command sent from a processor to BMGR 40.

In an embodiment, in order to increment or decrement a R_CNT corresponding to a buffer being allocated (or previously allocated), BMGR 40 sends a read command to memory 30 to read the R_CNT value from R_CNT array 98 corresponding to that buffer. When the R_CNT is received from memory 30, BMGR 40 increments or decrements the R_CNT value, and may write the updated RC_NT value back to memory 30 (depending on the updated value of R_CNT).

In an embodiment, decode logic block 44 is configured to process buffer allocation commands before processing other commands. In more detail, decode logic 44 includes decode logic 44a, master interface logic 44b, and pool state control logic 44d. Master interface logic block 44b includes a FIFO queue 44c used to hold de-allocation and increment commands from decode logic 44a. Buffer allocation commands received by decode logic 44a are processed when received, while buffer de-allocation commands and/or increment commands are stored in FIFO 44c for later processing by master interface control logic 44c. Therefore, a processor waiting for a buffer allocation command to be processed by BMGR 40 will not have to wait for processing of buffer de-allocation commands and/or R_CNT updates.

In an embodiment, decode logic 44 includes pool state control 44d to store pool context information and to access local memory 41. In this example, pool state control 44d is coupled to receive access requests from both command decode 44a and master interface control 44b. Pool state control 44d arbitrates access requests from command decode 44a and master interface logic 44d and performs reads and writes of data to local memory 41.

Each processor 21–29 and BMGR 40 may include an operating system, the operating system is software that controls the processor's operation and the allocation of resources. The term "process" or "program" refers to software, for example an application program that may be executed on a processor or computer system. The application program is the set of executable instructions that performs a task desired by the user, using computer resources made available through the operating system.

Processors 21–29 and BMGR 40 may be implemented in hardware, software, or a combination of the two. They may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications. They may also be implemented as a machine-readable storage medium, configured with a computer program, where, upon execution, instructions in the computer program cause a machine to operate in accordance with those applications.

The invention is not limited to the specific embodiments described above. For example, the above has described using processors in a multi-processor system. However, one or more processors may be implemented as functional units that include the capability of accessing a shared memory, for example, the functional units may be implemented as application-specific-integrated-circuits ("ASICS"). For example, the above has described using a local memory on BMGR 40. However, the local memory may be implemented, in part, as registers and used, for example, to store buffer indices, and pool context information. As another example, the above described a processor requesting a buffer allocation by sending a read command to BMGR 40 that specifies an allocate/deallocate register. However, the allocate/deallocate command could be implemented in another way that does not require specifying a register.

Other embodiments not described herein are also within the scope of the following claims.

What is claimed is:

1. A method comprising:
   storing a first free list of buffer indices having a first number of entries in a shared memory, each buffer index corresponding to an address of a buffer in the shared memory;
   storing a second free list of buffer indices having a second number of entries in a second memory in a circular queue, the second number being less than the first number of entries, by pre-fetching buffer indices from the first free list of buffer indices;
   receiving a first buffer allocation command from a first processor, the first buffer allocation command including a register address associated with a pool of buffers in the shared memory;
   determining whether a buffer is available in the buffer pool based upon an availability of a buffer index corresponding to a free buffer in the second free list; and
   if a buffer is determined to be available, allocating the buffer to the first processor.

2. The method of claim 1, further comprising:
   writing back a buffer index from the second free list to the first free list subsequent to a de-allocation of a buffer.

3. The method of claim 1, wherein the step of determining whether a buffer is available in the buffer pool comprises:
   storing buffer context information in the second memory, the buffer context information including at least one of a base pool address, a buffer size variable, and a number of buffers variable.

4. The method of claim 3, further comprises:
   determining a buffer index value or a buffer pointer address based upon a size of a buffer in the buffer pool.

5. The method of claim 3, further comprises:
   determining a buffer index value or a buffer pointer address based up on a number of buffers in the buffer pool.

6. The method of claim 1, wherein allocating further comprises:
   sending a buffer pointer address corresponding to the allocated buffer to the first processor.

7. The method of claim 6, wherein the address associated with a buffer pool comprises an address within an address range associated with the buffer pool.

8. The method of claim 1, further comprising:
   storing a reference count value m the shared memory, the reference count valued corresponding to a number of processors accessing the buffer.

9. The method of claim 8, further comprises:
   receiving a buffer increment command from a second processor, the buffer increment command including an address associated with the allocated buffer; and
   updating the reference count for the allocated buffer.

10. The method of claim 8, further comprises:
    receiving an allocation command that specifies a request for a plurality of buffers in the buffer pool; and
    allocating at least two buffers in the buffer pool.

11. The method of claim 8, further comprising:
    receiving a de-allocation command from at least one of the number of processors; and
    updating the reference count value for the allocated buffer.

12. A system comprising:
    a system bus;
    a plurality of processors coupled to the system bus;
    a shared memory coupled to the system bus to send and receive data from the plurality of processors and including a pool of buffers and an array of reference count values, each reference count value in the reference count array corresponding to a buffer in the buffer pool,
    a first free list of buffer indices having a first number of entries stored in the shared memory, each buffer index in the first free list corresponding to a buffer in the buffer pool; and
    a buffer manager coupled to the system bus to receive a buffer allocation command from at least one of the plurality of processors and send a buffer allocation response to the processor, said buffer manager operative to allocate a buffer from the buffer pool in response to a buffer allocation command from a one of the plurality of processors and send and receive data to and from the shared memory, the buffer manager comprising a local memory for storing a second free list of buffer indices having a second number of entries in the local memory that is less than the first number of entries in the first free list of buffer indices and a command decode logic block operative to receive and decode commands received from the plurality of processors, access the second free list of buffers stored in the local memory, and update a reference count in the reference count array.

13. The system of claim 12, further comprising:
    pool context information stored in the local memory, the pool context information corresponding to the buffer pool defined in the shared memory, the pool context information including at least one of a pool base address, a size of the buffer pool and a number of entries in the buffer pool.

14. The system of claim 13, wherein the decode logic further comprises logic operative to determine the buffer index and the buffer pointer address based on the pool context information.

15. An article comprising a storage medium having stored thereon instructions that when executed by a machine results in the following:

store a first free list of buffer indices having a first number of entries in a shared memory, each buffer index corresponding to an address of a buffer in the shared memory;

store a second free list of buffer indices having a second number of entries in a second memory, the second number being less than the first number of entries, by pre-fetching a buffer index from the first free list of buffer indices to be stored on the second free list;

receive a first buffer allocation command from a first processor, the allocation command including a register address associated with a pool of buffers in a shared memory;

determine whether a buffer is available in the buffer pool based upon an availability of a buffer index corresponding to a free buffer in the second free list; and if a buffer is determined to be available, allocate a buffer in the buffer pool to the first processor.

16. The article of claim 15, further comprising instructions that when executed by a machine results in the following:

write back a buffer index from the second free list to the first free list subsequent to the de-allocation of a buffer.

17. The article of claim 15, further comprising instructions that when executed by a machine results in the following:

determine a buffer index value or a buffer pointer address based upon a size of a buffer in the buffer pool.

* * * * *